United States Patent [19]
Lewkowicz

[11] 4,191,977
[45] Mar. 4, 1980

[54] BIASING OF MAGNETORESISTIVE READ HEAD USING GYRATORS

[75] Inventor: Julian Lewkowicz, Tucson, Ariz.

[73] Assignee: International Business Machines Corporation, Armonk, N.Y.

[21] Appl. No.: 947,308

[22] Filed: Sep. 29, 1978

[51] Int. Cl.² ............................ G11B 5/47; G11B 5/12
[52] U.S. Cl. ........................................ 360/66; 360/113
[58] Field of Search ................... 360/113, 110, 66, 67

[56] References Cited

U.S. PATENT DOCUMENTS

| | | | |
|---|---|---|---|
| 3,969,769 | 7/1976 | Gorter et al. | 360/113 |
| 4,050,086 | 9/1977 | Harr | 360/113 |
| 4,075,671 | 2/1978 | Cheatham et al. | 360/113 |
| 4,142,218 | 2/1979 | Gorter | 360/113 |

OTHER PUBLICATIONS

"Direct Coupled Magnetoresistive Head" by Cheatham, IBM T.D.B., vol. 18, No. 1, 6/75.

Primary Examiner—Vincent P. Canney
Attorney, Agent, or Firm—James A. Pershon; Joscelyn G. Cockburn

[57] ABSTRACT

An electromagnetic transducer particularly of the magneto-resistive (MR) type is biased by an inductive circuit means and operates within the linear portion of its characteristic curve. The inductive circuit means is interconnected to the output terminals of said transducer. An amplifier means is connected to the output terminals of the transducer and the inductive circuit means. The amplifier means is also biased by the inductive circuit means. The biasing scheme is enhanced when a gyrator is used as the inductive circuit means.

17 Claims, 8 Drawing Figures

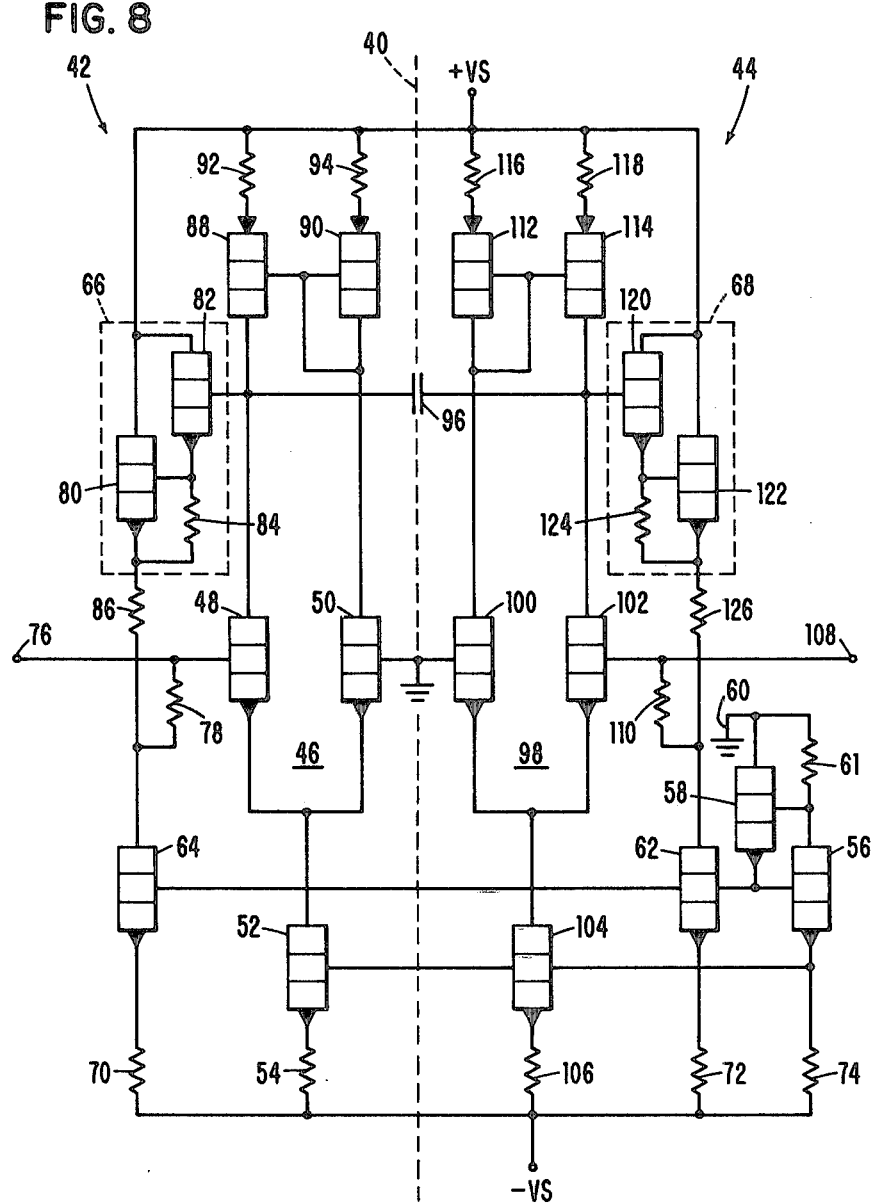

BIASING OF MAGNETORESISTIVE READ HEAD USING GYRATORS

BACKGROUND OF THE INVENTION

1. Field of the Invention

The invention relates to circuitry for simultaneously biasing an electromagnetic transducer, particularly of the M-R type, and amplifying a signal generated by said transducer.

2. Description of the Prior Art

The use of electromagnetic transducers, particularly of the M-R type to reproduce pre-recorded data from a length of magnetic media is well known in the prior art. The scientific principle upon which an electromagnetic transducer of the M-R type operates is that an M-R element exhibits a change in resistance $\Delta R$ as a function of an electromagnetic flux $\phi$ to which the element is exposed. The functional relationship between resistance and electromagnetic flux is utilized in adapting an M-R element to reproduce pre-recorded magnetic data.

Generally, the change in resistance $\Delta R$ of an M-R device is an essentially non-linear function of the strength of the magnetic field H to which the device is exposed. In order to adapt the M-R device as an electromagnetic transducer and, particularly, a read transducer, it is desirable to center operation in the most linear region of the characteristic curve. This result is accomplished in the prior art by biasing the M-R device.

Prior art methods and apparatus for biasing M-R devices so as to enable said device to reproduce pre-recorded data may be broadly characterized into two classes. Each of the classes will be described hereinafter. The present invention which will be described hereinafter does not necessarily relate to apparatus and method characterized in the first class.

U.S. Pat. No. 2,500,953 issued Mar. 21, 1950 to M. L. Lisman and U.S. Pat. No. 1,596,558 issued Aug. 17, 1926 to B. N. Sokoloff are examples of the apparatus characterized in the first class. In this class of devices, the bias is supplied by a magnetic field generated from either an electromagnetic or a permanent magnet. Probably the most undesirable aspect with devices falling in this class is bulkiness due to the size of the magnets. The direction in which the technology moves is to fabricate an M-R transducer having relatively small size and less bulk.

This direction leads to the second class of prior art transducers. The present invention primarily relates to this class. With the advent of thin film technology the goal of fabricating an M-R transducer with reduced size and less bulk is realized. In essence, a first layer of thin film is deposited on a substrate with a second layer of thin film, sometimes referred to as the biasing film, deposited in proximity to the first film. An electrical current is applied to the second thin film. As a result of the current flow, an electromagnetic field is created which, in turn, biases the first film. Prior art examples of the second class of M-R transducers are described in U.S. Pat. No. 3,016,507 issued to Grant et al. on January 9, 1962, U.S. Pat. No. 3,366,939 issued to DeChanteloup on Jan. 30, 1968 and U.S. Pat. No. 3,678,478 issued to Copeland on July 18, 1972.

A further improvement in the second class of transducers, hereinafter called the thin film transducers, is achieved when a common circuit is used to generate the bias current and to bias a sensing circuit which processes signals outputted from the M-R transducer.

In one of the prior art schemes a resistive network is used to D.C. bias the M-R film and the sensing circuit. More particularly, two sections of an M-R transducer are interconnected to two balancing resistors to form a four-arm bridge circuit. The value of the balancing resistors are chosen to control bias current flowing through the M-R film as well as balancing the bridge. A more detailed description of the resistive approach to bias M-R transducers is described in U.S. Pat. No. 3,814,863 issued to R. L. O'Day et al on June 4, 1974.

In another prior art scheme, current sources are used for biasing. In this approach current sources are directly connected to the M-R film and supply the current for biasing said films. A more detailed description of the approach is given in U.S. Pat. No. 4,040,113 issued on Aug. 2, 1977 to F. W. Gorter.

Although the above described prior art biasing schemes work satisfactorily for the intended purpose, these schemes have drawbacks which the below described invention will solve.

One of the drawbacks of the prior art biasing scheme is that the balancing resistors must be necessarily larger than the resistance of the M-R film. This means that most of the excitation current is dissipated in the balancing resistors.

Another drawback which plagues the prior art biasing scheme is that whenever current source is used as the biasing means, an unusual amount of noise is generated by the current source. The additional noise adversely affects the overall system performance.

A common problem which is associated with either resistive biasing or current source biasing is that an offset voltage is generated across the input of the circuit which processes the signal outputted from the M-R transducer. This offset voltage tends to saturate a preamplifier which is usually used in the processing circuit.

To solve the offset voltage problem, the prior art adapts A.C. coupling instead of D.C. coupling to connect the M-R transducer to the processing circuitry. A.C. coupling requires additional components such as coupling capacitors, etc. The effect of A.C. coupling reduces the simplicity of the system and increases the system cost. U.S. Pat. No. 4,050,086 issued to Jerome Danforth Harr on Sept. 20, 1977 and assigned to the assignee of the present invention describes an apparatus for biasing an M-R transducer. The device alleviates the offset voltage problem. D.C. biasing current is applied to the transducer by way of a series circuitry comprising a source of unidirectional voltage and/or current, the transducer itself, and a controllable substantially constant current adjustment circuit having control input terminals.

SUMMARY OF THE INVENTION

It is, therefore, the object of the present invention to bias an electromagnetic transducer, particularly of the M-R type in a more simple and efficient manner than was heretofor possible.

It is a further object of the present invention to bias an electromagnetic transducer so as to alleviate offset voltage at the output of the transducer.

It is still another object to bias an electromagnetic transducer and an amplifier connected to the output of said amplifier with a common circuit.

It is still a further object of the invention to bias an electromagnetic transducer so as to enhance the packaging of a plurality of said transducers in a single package.

The stated objects, together with more objects and a solution to the drawbacks of the prior art are realized by the present invention. More specifically, a unidirectional current path is generated through an electromagnetic transducer, particularly the M-R type, having a pair of M-R elements arranged in a parallel configuration, by connecting a voltage source to the M-R elements and a pair of inductive elements, one of each, interconnected between a reference potential and one terminal of the M-R elements.

In one embodiment of the invention, an amplifier means and associated automatic gain control loop is interconnected across an output terminal of the M-R elements.

In another embodiment of the invention a gyrator is used as the inductive means for biasing the transducer and provides automatic frequency compensation for the gain control loop.

In still another embodiment of the present invention a differential cross coupled gyrator is used to bias the transducer. When the differential cross coupled gyrator is used as the biasing element, a multi-track transducer is biased in a more efficient manner.

The foregoing and other objects, features, and advantages of the invention will be apparent from the following more particular description of preferred embodiments of the invention, as illustrated in the accompanying drawings.

BRIEF DESCRIPTION OF THE DRAWINGS

FIG. 8 shows detail of an alternate differential coupled gyrator.

DETAILED DESCRIPTION

Figure 1:
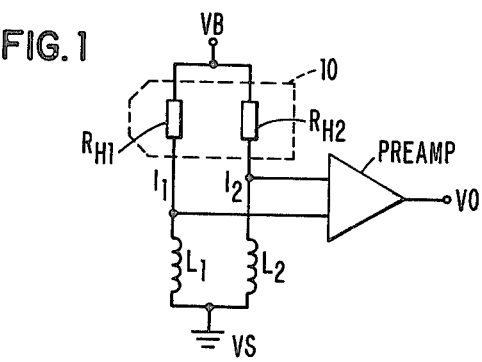
FIG. 1 shows a functional diagram of a basic circuit according to the present invention.

Referring now to FIG. 1, a biasing circuit according to the present invention is shown. An electromagnetic transducer, 10, particularly of the thin film type and more particularly of the M-R type is depicted by resistive element $R_H1$ and $R_H2$. The M-R transducer is connected to a D.C. voltage supply means $V_B$. The D.C. voltage supply means is hereinafter called a unidirectional voltage supply source $V_B$. The output of resistive element $R_H1$ is interconnected to an inductive means $L_1$ and one of the input terminals of a preamplifier circuit means. The other terminal of $L_1$ is interconnected to a reference voltage source $V_S$. In the preferred embodiment of the present invention, $V_S$ is chosen to be at ground level. Resistive elements $R_H2$ is interconnected to the other input terminal of the preamplifier circuit means and inductive means $L_2$. The other terminal of inductive means $L_2$ is connected to $V_S$. The inductive means $L_1$ and $L_2$ provide means of coupling biasing voltage $V_B$ to the M-R transducers and simultaneously provides A.C. coupling of the output signal from the M-R transducer to the preamplifier means. As will be explained subsequently, the output from the preamplifier means $V_O$ is supplied to a utilization circuit (not shown).

As can be observed from the configuration in FIG. 1, the magnitude of bias current ($I_1$ and $I_2$) is determined by $V_B$ and $RH_1$, and $RH_2$. Essentially, $I_1$ is equal to $V_B$ divided by $R_H1$.

$I_2$ is equal to $V_B$ divided by $R_H2$. Since the bias current is the ratio of $V_B$ to $R_H1$ and $R_H2$ then if $V_B$ is maintained constant and $R_H1$ and $R_H2$ varies, the value of the bias current is determined by the magnitude of $R_H1$ and $R_H2$ respectively. As such, the scheme is self adjusting where higher resistive transducers will draw smaller bias current from the voltage supply source. Of course, this analysis does not include the negligible resistance generated by the inductive elements $L_1$ and $L_2$.

The scheme is further simple and low cost in that the M-R transducer is coupled to the preamplifier means. Moreover, the scheme allows maximum amount of signal to be passed for amplifying to the preamplifier and also minimum the amount of signal current which is consumed by $L_1$ and $L_2$. As is well known to those skilled in the art, the overall reactance of an inductor is a complex expression. Essentially, $Z = R \pm j \omega L$ where
$Z$ = total reactance of the inductor;
$R$ = DC component of the inductors resistance
$j$ = a complex number
$\omega$ = the frequency at which the device is operated
$L$ = the value of the inductor in Henry For D.C. application, the imaginary portion ($\pm j \omega L$) of the expression is not effective. Likewise, R is extremely small within the range of $1\Omega$.

Applying this principle to FIG. 1, for D.C. biasing the inductor appears to be a short to ground. In essence, the voltage across the inductor is within the millivolt range. As such, most of the biasing voltage is across the M-R element. For A.C. application, when the signal across the M-R element $R_H1$ and $R_H2$ is changing, then R is negligible compared to $j\omega L$. In essence, the inductor appears to be an open circuit and all of the signals are fed into the preamplifier.

Figure 2:
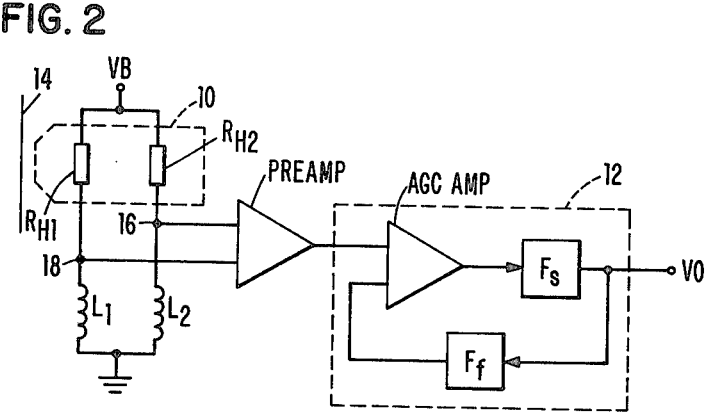
FIG. 2 shows a read portion of a recording channel connected to the circuit of FIG. 1. The depiction of FIG. 2 is one of usage to which the invention may be adapted.

Another benefit which enures from the above configuration of FIG. 1 is that the Johnson noise is relatively low. As is well known to those skilled in the art, Johnson noise $P_N = 4KT\, B\omega\, R_N$ where K = Boltzmann constant
T = operating temperature
$B\omega$ = band width
$R_N$ = DC resistance of the inductor Referring now to FIG. 2, electromagnetic transducer 10 is adapted for use in the recording channel 12 of a recorder. More particularly, the electromagnetic transducer is used for reading data recorded in the form of electromagnetic transitions on a recording media 14. The recording media may be a length of magnetic tape or a disk. By positioning the magnetic media relative to the electromagnetic transducer, the resistance of the M-R element changes and, as such, a current is outputted from terminal 16 and 18 which is amplified by the preamplifier means and is fed into the recording channel. It is worthwhile noting that although the schematic of FIG. 2 depicts a single track magnetic head 10 which reads a single track from the recording media, in actuality a plurality of tracks are positioned on the media 14 and, as such, a multi-track head is required for reading the multiple track simultaneously. In a multi-track arrangement, a plurality of M-R elements are embodied in magnetic transducer 10. As was stated previously, the read chain of the read channel 12 receives electrical signals from the preamplifier means. The signal is processed and is delivered at terminal $V_O$ to a utilizing device, usually a controller of a tape transport system. The signal is indicative of data usually digital data recorded on media 14. The recording channel includes an automatic gain control (AGC) amplifier connected in tandem with a read filter $F_s$. The AGC amplifier is usually a variable gain amplifier and is controlled so as to select an operating level depending upon the characteristics of the reproduced signal. Likewise, the read filter or equalizer usually modifies the signal outputted from the AGC amplifier so as to equalize the amplitude. The output from the read filter is fed to the terminal $V_O$. A feedback generator $F_f$ samples the output of the signal from the output and feeds its input to the AGC amplifier to control the gain of said amplifier.

One of the predominant characteristics of a recording channel and, in particularly, the reproduction section of said channel is that a compensation means is needed in the channel to correct for variation in signal amplitude. Generally, low frequency signals have higher signal amplitude whereas high frequency signals have lower amplitude. However, when inductors $L_1$ and $L_2$ are used as the biasing elements automatic frequency compensation is achieved by selecting the proper value of $L_1$ and $L_2$ respectively. Stated another way, the need for a built in compensator in the recording channel is alleviated. The key factor in utilizing the bias inductors to achieve automatic compensation is the realization that the frequency pole ω is equal to $R_H1$ divided by $L_1$ or $R_H2$ divided by $L_2$ where ω is the desired frequency $R_H1$ $R_H2$ equals the film resistance and $L_1$, $L_2$ equals the value of the inductor. By selecting L, the frequency pole is modified from 0 to any desired value.

Figure 5:
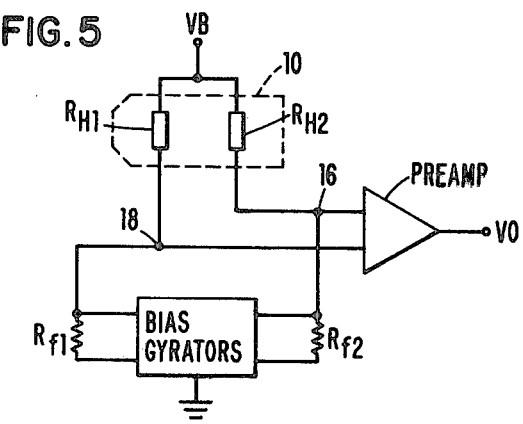
FIG. 5 shows a functional diagram of an alternate embodiment of the invention using gyrators for biasing the transducer.

Referring now to FIG. 5, the inductive means is simulated by a bias gyrator pair. As with the previously described figures, like elements in FIG. 5 are identified by common numerals, in particularly, common numerals used in FIGS. 1 and 2. To this end the M-R element $R_H1$ and $R_H2$ are tied to supply voltage $V_B$. The terminals of $R_H1$ and $R_H2$ respectively are tied to the input of preamplifier while the output of the preamplifier is tied to output terminal $V_O$. The bias gyrators shown in block diagram form in FIG. 5 are tied through feedback resistors $RF_1$ and $RF_2$ to the output terminal 16 and 18 of the M-R element $R_H1$ and $R_H2$ respectively. By using gyrators as the biasing element, several improvements are observed. More noticeable gyrators radiate less than common inductors. As such, there is no need for shielding the gyrators from interference with adjacent circuits. Also, generally relatively large inductors are needed and, as such, requires relatively large space for packaging. This defect is further personified in a multi-track environment where a plurality of inductors are needed for biasing a plurality of M-R elements. However, by using gyrators a plurality of said gyrators is packaged in an integrated circuit pack and, therefore, minimized the required space.

Figure 3:
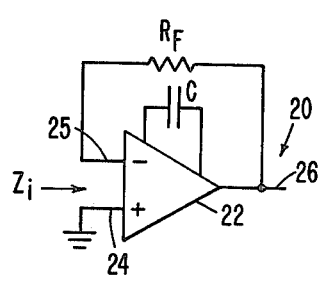
FIG. 3 shows a basic gyrator circuit which is used as a biasing element.

Referring to FIG. 3 for the moment, a gyrator 20 which simulates an inductor is shown. The gyrator includes a bipolar operational amplifier 22 with input terminals 24, 25 and output terminal 26. The output terminal is tied to one of the input terminals through a feedback resistor $R_F$. As will be shown shortly, the impedance $Z_i$ looking into the operational amplifier is a complex number somewhat similar to the complex impedance of the above described inductor. Likewise, the complex impedance gives the same favorable result which is experienced by using the inductor above. Primarily, at D.C. level the gyrator is a short circuit, and for A.C. signal the gyrator is an open circuit.

Figure 4:
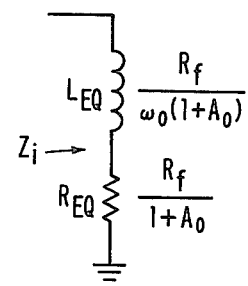
FIG. 4 is an equivalent circuit for the input impedance of the gyrator circuit shown in FIG. 3. This equivalent circuit is helpful in understanding the overall benefit derived from use of the gyrator.

Turning to FIG. 4 for the moment, the equivalent circuit of FIG. 3 is shown. In essence, the equivalent circuit in FIG. 3 is shown by an inductor $L_{eq}$ in series with a resistance means $R_{eq}$. By use of Millers Theorem it can be shown that:

$$Z_i = (R_f/1-A) \quad \text{(Equation 1)}$$

where
$Z_i$ = complex impedance
$R_f$ = feedback resistance
A = Amplifier gain
For most operational amplifiers, the gain:

$$A = \frac{-A_o}{1 + j\frac{(\omega)}{\omega_o}} \quad \text{(Equation 2)}$$

where
$A_o$ = DC open loop gain
$\omega_o$ = 3 dB down roll-off frequency determined by value of capacitance C.
This analysis neglects the second high frequency pole. Substituting Equation 2 into Equation 1 for A:

$$Z_1 = \frac{R_f}{1 + j\frac{(\omega)}{\omega_o} + A_o} + j\omega \frac{\frac{R_f}{\omega_o}}{1 + j\frac{(\omega)}{\omega_o} + A_o} \quad \text{(Equation 3)}.$$

For input frequencies ω less than $(A_0+1) \omega_0$, the denominator of equation 3 can be approximated to be simple $(A_0+1)$, introducing very insignificant magnitude of phase angle error. Equation 3 then becomes $$Z_i = \frac{R_1}{1 + A_o} + j\omega \frac{(R_1)}{\omega_o (1 + A_o)}$$

Let $j\omega = s$ where s equals frequency in a Laplace transform domain then:

$$Z_i = \frac{R_f}{1 + A_o} + S\frac{R_f}{\omega_o(1 + A_o)}$$

where
$A_0$ = D.C. gain of operational amplifier
$\omega_0$ = dominant pole set by capacitor C
$R_f$ = feedback resistor
By observing the equivalent circuit in FIG. 4, it is evident that $R_{eq}$ equals $R_f/1+A_0$ and $L_{eq} = R_f/\omega_0(1+A_0)$. It is worthwhile noting that the above analysis allows the use of a gyrator as the biasing element with the benefits derived when an inductor is used as the biasing element. A more detailed discussion of a gyrator to simulate an inductor is given in an article entitled "Operational Amplifiers As Inductors by Moise Hamaoui (Fairchild Semiconductor Division)" and identified as Fairchild Application Note #321.

Referring back to FIG. 5 a pair of gyrators having feedback resistors $R_{f1}$ and $R_{f2}$ are packaged and connected to terminals 16 and 18 of M-R element $R_{H2}$ and $R_{H1}$ for biasing said elements and to generate a unidirection current flow from $V_B$ through $R_{H1}$ and/or $R_{H2}$, to maintain the operating point of said element about the linear portion of the characteristic curve, while the output signal from said element is amplified by the preamplifier means and directed to terminal $V_0$.

Figure 6:
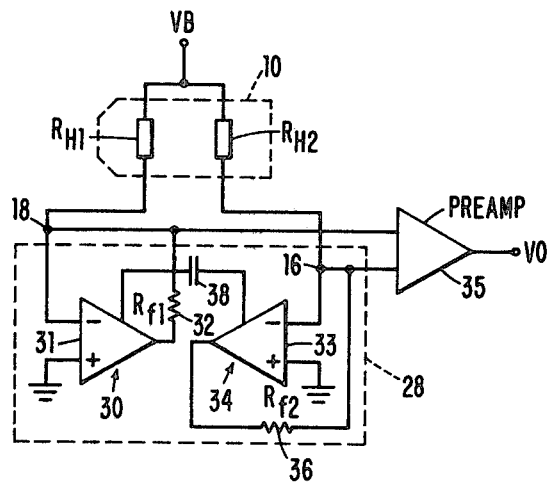
FIG. 6 shows a biasing scheme utilizing differential coupled gyrators.

Referring now to FIG. 6, an alternate embodiment of the invention is shown. In this embodiment of the invention, a differential coupled gyrator (DCG) 28 is used to bias the preamplifier means and the M-R element $R_{H1}$ and $R_{H2}$ so that unidirectional current flowing from unidirectional voltage means $V_B$ is directed through $R_{H1}$ and $R_{H2}$ to bias said element so as to enable them to operate in the linear portion of the characteristic curve. By using the differential cross-coupled gyrator, the biasing of a multi-track M-R transducer is further enhanced. In FIG. 6, gyrator 30, which includes a bipolar operational amplifier 31 together with feedback resistor 32 is connected at terminal 18 to M-R element $R_{H1}$. Likewise, gyrator 34 which includes a bipolar operational amplifier 33 together with a feedback resistor 36 is connected to M-R element $R_{H2}$ at node 16. A common capacitor 38 is shared by gyrator 34 and 30 respectively. As was stated previously, the capacitor is necessary in the configuration for simulating the dominant pole of the gyrator. By using a common capacitor between two gyrators, more gyrators can be packaged in a single package and, therefore, the biasing of a multi-track head is further enhanced. The output from the gyrators 30 and 34, respectively, are fed into a preamplifier which may be a bipolar operational amplifier 35 and the output of said amplifier is fed to terminal $V_0$.

Referring now to FIG. 8, a differential coupled gyrator, according to the teachings of the present invention, is shown. The circuit is symmetrical along dashed line 40. The circuit includes differential amplifier 42 and differential amplifier 44. The amplifiers are connected between a pair of reference voltage sources $V_S$ and $-V_S$.

Still referring to FIG. 8, differential amplifier 42 includes a voltage amplification stage 46 called the first amplification stage 46. The voltage amplification stage includes emitter coupled pair transistors 48 and 50 respectively. A current source 52 is connected through bias resistor 54 to reference voltage source $-V_S$. The referenced voltage needed for the current source is generated by transistors 56 and 58 respectively. The collector of transistor 56 is tied to a reference voltage 60 through resistive means 61. In the preferred embodiment of this invention, the reference voltage 60 was chosen to be ground. The base of transistor 58 is tied to the collector of transistor 56. The emitter of transistor 58 is connected to the base of transistor 56 and to current source 62 and 64, respectively. As will be explained subsequently, current source 62 and 64 respectively perform a dual function each; essentially, as a current source for buffer stage 66 and 68 respectively and as a current sink for the M-R head bias current.

Still referring to FIG. 8, the current source 62 and 64 respectively are connected via resistive means 70 and 72 respectively to $-V_S$. Likewise, transistor 56 is tied to $-V_S$ through resistive means 74. Output 76 (also called first output terminal 76) is tied through feedback resistor 78 (also called first feedback resistor 78) to the base of transistor 48. Likewise, the collector of transistor 64 is tied through feedback resistor 78 to the base of transistor 48. As was stated previously, a buffer stage 66 is interposed between the voltage amplification stage 46 and output 76. The buffer stage comprises transistors 80 and 82, respectively. A pair of biasing resistors, 84 and 86, respectively, are connected to the emitter of the transistors. The buffer stage 66 has a gain of approximately 1 and functions as a high impedance source to isolate the output 76 from the amplification voltage stage 46. A pair of active load transistors 88 and 90, respectively, are connected in the collector circuit of transistors 48 and 50, respectively. The emitter of transistor 88 and 90 respectively are interconnected through resistive means 92 and 94 to reference voltage means $+V_S$. Common capacitor 96 is connected to the collector of transistor 48.

Still referring to FIG. 8, differential amplifier 44 is identical to previously described differential amplifier 42. Differential amplifier 44 includes a voltage amplification stage 98 (sometimes called second amplification stage 98) which includes transistor 100 and 102. A current source 104, hereinafter called the third biasing means, is interconnected to the emitter of transistor 100 and 102. The current source is the biasing means for voltage amplification stage 98 and sets the range over which said transistors operate. A resistive means 106 interconnects the emitter of transistor 104 to the reference voltage source $-V_S$. The referenced voltage source needed for transistor 104 is supplied by transistor 58 and 56 respectively. Output voltage 108 is interconnected through feedback resistor 110 to the base of transistor 102. Active load circuit transistors 112 and 114, respectively, are interconnected in the collector circuit of transistor 100 and 102 respectively. The load transistors are connected through resistors 116 and 118 to positive voltage supply means $V_S$. Transistors 120 and 122 form a buffer stage which isolates output 108 from the input of amplifier stage 98. Resistors 124 and 126 are interconnected to the emitter circuit of transistors 120 and 122 and operates to bias said transistor.

Although a range of values may be used for the components disclosed in the above figure, in the preferred embodiment of this invention the following values were used for the electrical components.

| ELEMENTS | COMPONENTS | VALUE |
| --- | --- | --- |
| 54 | Resistor | .59 Kohms |
| 62 | Resistor | .45 Kohms |
| 70 | Resistor | .037 Kohms |
| 72 | Resistor | .037 Kohms |
| 74 | Resistor | .26 Kohms |
| 78 | Resistor | .1 Kohms |
| 84 | Resistor | 1.0 Kohms |
| 86 | Resistor | .22 Kohms |
| 92 | Resistor | 1.3 Kohms |
| 94 | Resistor | 1.3 Kohms |
| 96 | Capacitor | 47μF |
| 106 | Resistor | .59 Kohms |
| 116 | Resistor | 1.3 Kohms |
| 118 | Resistor | 1.3 Kohms |
| 124 | Resistor | 1.0 Kohms |
| 126 | Resistor | .22 Kohms |

As was stated previously, feedback resistors 78 and 110, respectively, together with the shared capacitor 96, determines the value of an equivalent inductance. The capacitance is shared between two amplifiers 46 and 98, respectively, to generate two equivalent inductances between each output and reference voltage means 60. As was stated previously, reference voltage source 60 is chosen to be ground. As stated previously, $L_{eq}=R_f/\omega_o(1+A_o)$—Equation 1. Where $R_F=$ feedback resistors 78 or 110, $\omega_o$ dominant pole; and $A_o$ amplifier gain. For $A_o$ much greater than 1 then $$L_{eq}=R_F/\omega_o A_o$$

The dominant pole is:

$$\omega_o=1/Rc2c \text{ —Equation 2}$$

Where C is the value of the shared capacitor 96 and $R_C$ is the collector load resistance.

The amplifier D.C. gain is $$A_O=Rc/2re \text{ —Equation 3}$$

where re-equals $KT/gIE$
where
K—Boltzmann constant
T—Temperature
IE—Emitter current Substituting Equation 3 and 2 into Equation 1, it can be shown that $L_{eq}=4\ R_F$ Cre—Equation 4. As is evident from Equation 4, the equivalent inductance value is dependent only on feedback resistance $R_F$, the shared capacitance and transistor parameter re; and is not dependent on the gain of the amplifier and collector resistance value. It should be noted that since $L_{eq}$ depends on re then this parameter should be controlled with known circuit techniques to make it independent of power supply and temperature variations. It should also be noted that the above analysis is applicable to either amplifier 46 or amplifier 98.

Figure 7:
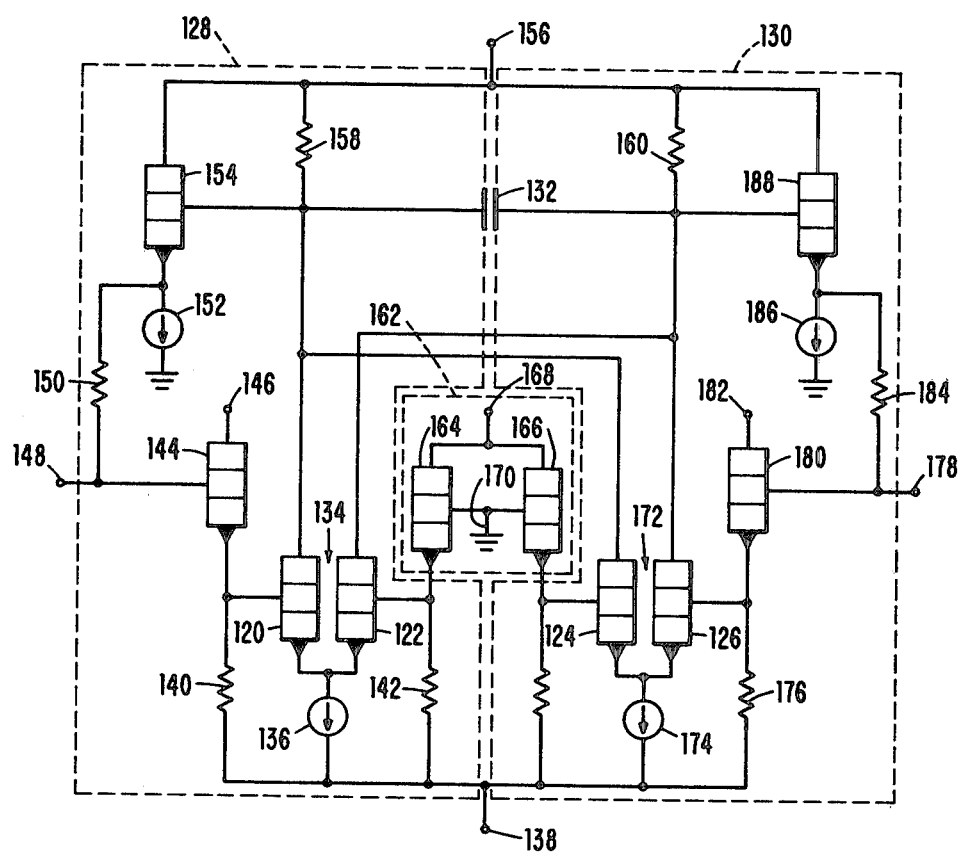
FIG. 7 depicts a differential coupled gyrator in greater detail.

Referring now to FIG. 7, an alternate embodiment of the differential cross coupled gyrator is shown. In this embodiment the collectors of transistors 120, 122, 124 and 126 are cross coupled. As with FIG. 8, the embodiment in FIG. 7 includes differential amplifier stage 128 and 130 respectively. The stages are symmetrical about shared capacitor 132.

The differential amplifier 128 includes voltage amplifier stage 134. The voltage amplifier stage includes emitter coupled transistors 120 and 122, respectively. The emitter coupled transistors are interconnected through a current source 136 to a reference voltage source 138. In the preferred embodiment of this invention, the referenced voltage source is negative. The base of transistors 120 and 122, respectively, are interconnected to the reference voltage source 138 through biasing resistors 140 and 142, respectively. The base of transistor 120 is connected to a driver means 144. In the preferred embodiment of this embodiment, the driver means is an emitter follower transistor wherein the collector of said transistor is tied to a reference voltage potential 146. In the preferred embodiment of this invention, the reference potential 146 is positive. The base of transistor 144 is connected to output terminal 148 and is also interconnected through feedback resistor 150 to a bias current source 152. The reference voltage needed for the bias current source is supplied by driver means 154. In the preferred embodiment of this invention, driver means 154 is an emitter follower transistor with its collector tied to a reference potential means 156. In the preferred embodiment of this invention, the reference potential means is a positive reference voltage. The cross coupled collectors of transistors 120, 122, 124 and 126, respectively, are tied to reference potential means 156 through biasing resistors 158 and 160, respectively. The collector of transistor 120 is tied to shared capacitor 132. A buffer stage 162 is interconnected to the base of transistor 122. The buffer stage functions to level shift reference voltage 170 to the base of transistor 122. The buffer stage simulates a high impedance means. The buffer stage comprises two emitter follower transistors, 164 and 166, respectively. The collectors of transistors 164 and 166 are interconnected to a reference voltage source 168 while the base of said transistors are interconnected to a reference voltage source 170. In the preferred embodiment of this invention, reference voltage source 168 is positive while reference voltage source 170 is at ground potential.

Likewise, differential amplifier 130 includes a voltage amplification stage 172. The voltage amplification stage includes emitter coupled transistors 124 and 126, respectively. The coupled emitter of transistors 124 and 126 are tied to reference voltage source 138 through current source 174. The base of transistor 126 is interconnected through bias means 176 to reference voltage 138. The base of transistor 124 is interconnected to buffer stage 162. The buffer stage operates to level shift reference voltage 170 to the base of transistor 124. The base of transistor 126 is interconnected to the emitter of driving transistor 180, while the collector of transistor 180 is tied to a reference potential 182. In the preferred embodiment of this invention, reference potential 182 is positive. The base of transistor 180 is interconnected through feedback resistor 184 to a fourth bias means 186. The fourth bias means is a current source in the preferred embodiment of this invention. The reference voltage needed for the current source is supplied from emitter follower transistor 188.

This completes the detailed description of the present invention.

Although the present invention has been particularly shown and described with reference to preferred embodiments thereof, it will be understood by those skilled in the art that various changes in form and details may be made therein without departing from the spirit and scope of the invention.

Having thus described my invention, what I claim as new, and desire to secure by Letters Patent is:

1. A reproducing device, for use with the read chain of a recording channel, comprising in combination:

an M-R transducer;

a voltage supply source connected to the transducer;

a first operational amplifier means connected to a first terminal of the transducer;

a second operational amplifier means connected to a second terminal of the transducer;

a shared capacitive means interconnecting the first operational amplifier means and the second operational amplifier means;

a first feedback resistor operably associated with the first operational amplifier means; and a second feedback resistor operably associated with the second operational amplifier means whereby each amplifier means, together with its associated feedback resistor and the shared capacitive means simulates an inductive means suitable for biasing said M-R transducer.

2. In a recorder where data is reproduced from a recording medium an apparatus for reproducing said data comprising in combination:

an electromagnetic transducer;
a differential cross coupled gyrator means connected so as to allow bias current to flow in the transducer, said differential cross coupled gyrator including a common capacitive means and
a first and second differential amplifier means positioned to be symmetrical about the capacitive means;
amplifying means operably connected across a common terminal of the transducer and the gyrator; and
means connected between the transducer and the gyrator means for providing a unidirectional voltage supply.

3. The device claimed in claim 2 wherein the first differential amplifier means includes:
an amplification stage;
a first biasing source operably connected to the amplification stage;
active load circuit means operably connected to the amplification stage;
an output terminal operably connected to the amplification stage;
a first feedback circuit operably connected to the amplification stage;
a high impedance means operable to isolate the amplification stage from the output terminal;
a second biasing source connected to and operable for biasing the high impedance means; and
means for generating a reference voltage source for the first and second biasing source.

4. The device as claimed in claim 3 wherein the amplification stage includes a pair of emitter coupled transistors.

5. The device as claimed in claim 3 wherein the amplification stage is further characterized by being a voltage amplification stage.

6. The device claimed in claim 2 wherein the second differential amplifier means includes:
an amplification stage;
active load circuit means connected to the amplification stage;
a third biasing means connected to and operable to bias the amplification stage.
an output terminal connected to the amplification stage;
a second feedback circuit operably connected to the amplification stage;
an isolating means connected so as to isolate the output terminal from the amplification stage;
a fourth biasing source connected to the isolating means; and
means for generating a reference voltage source for the third and fourth biasing source.

7. The apparatus as claimed in claim 2 wherein the differential cross coupled gyrator means includes:
a capacitor;
a pair of amplification stages positioned symmetrically about the capacitor;
each amplification stage having a pair of emitter follower transistors with the collectors of the transistors arranged in a cross coupled configuration;
first means for biasing the amplification stages;
a pair of output terminals; one of each connected to one of the amplification stages;
means for isolating the amplification stages from the output terminals;
second means for biasing the isolating stage;
drive means operably connected to the amplification stage; and
third biasing means for biasing said drive means.

8. The apparatus as claimed in claim 7 wherein the first means is a current source.

9. The apparatus as claimed in claim 7 wherein the second biasing means is a resistive means.

10. A differential cross coupled gyrator comprising in combination:
a capacitive means with two terminals connected thereto;
a first amplification stage connected to one of the terminals;
first active load circuit means connected to the amplification stage;
a first output terminal;
a feedback means interconnecting the amplification stage with said terminal;
means for isolating the output terminal from the amplification stage;
first biasing means to bias said amplification stage;
second biasing means for biasing the isolating means;
a second amplification stage connected to the second capacitive plate;
second active load circuit means operable for loading the second amplification means;
a second output terminal;
a second feedback means interconnecting the second output terminal to the second amplification stage;
second means for isolating the second output from the second amplification stage;
third bias means for biasing the amplification means;
fourth bias means for biasing the second isolating means; and
reference voltage source operably connected to the bias means.

11. A differential gyrator for use with an M-R transducer comprising in combination:
a capacitor;
a first and a second amplification stage positioned symmetrically with the capacitor;
a first and a second bias means operable for biasing the first and second amplification stage;
a pair of output terminals one of each connected to the first and second amplification stages;
a pair of feedback resistive means interconnecting the output terminal of each stage with the associated amplification stage;
a pair of isolating means operable to isolate each stage from the output terminal;
first means for biasing the amplification stages;
second means for biasing the isolating means; and
a reference source operably connected to the biasing means.

12. The gyrator as claimed in claim 11 wherein a plurality of said gyrators are packaged in a single module and said module being operable to bias a multi-track M-R transducer.

13. A differential gyrator for use with an M-R transducer comprising in combination:
a capacitor;
a pair of amplification stages positioned symmetrically about the capacitor;
each amplification stage having a pair of emitter follower transistors with the collectors of the transistors arranged in a cross coupled configuration;
first means for biasing the amplification stages;

a pair of output terminals; one of each connected to one of the amplification stages;

means for isolating the amplification stages from the output terminals;

second means for biasing the isolating stage;

drive means operably connected to the amplification stage; and third biasing means for biasing said drive means.

14. The gyrator as claimed in claim 13 wherein a plurality of said gyrators are packaged in a single module and said module being operable to bias a multi-track M-R head.

15. A circuit for use with an MR transducer comprising in combination:

a first and second operational amplifier means connected to said transducer;

a shared capacitive means interconnecting said first and second operational amplifier means; and a first and second feedback circuit operably associated with said first and second operational amplifier means, respectively;

said amplifier means, together with its associated feedback circuit and the shared capacitive means, simulating an inductive means suitable for biasing the MR transducer.

16. A circuit as defined in claim 15 further including an amplification means connected to the interconnection between the MR transducer and said first and second operational amplifier means.

17. In the recording channel of a recorder wherein an electromagnetic transducer reads pre-recorded data from a recording media, a dynamic apparatus for supplying bias current so that the transducer operates in a desired region of a characteristic curve, said apparatus comprising in combination:

a first and second operational amplifier having a first input from each connected to a separate portion of the transducer;

a first and second feedback circuit connected between an output and the first input of each first and second operational amplifier, respectively;

a capacitive means interconnecting said first and second operational amplifier; and means connected between a common connection of the separate portions of the transducer and a second input of said first and second operational amplifier for providing a unidirectional voltage supply.

* * * * *